(12) United States Patent
Dorawa et al.

(10) Patent No.: US 8,778,117 B2
(45) Date of Patent: Jul. 15, 2014

(54) METHOD FOR PRODUCING AN INTEGRAL, REINFORCED FIBRE COMPOSITE COMPONENT AS WELL AS A HOLLOW FIBRE COMPOSITE COMPONENT

(75) Inventors: Tobias Dorawa, Hamburg (DE); Torben Jacob, Beckdorf (DE)

(73) Assignee: Airbus Operations GmbH, Hamburg (GE)

( * ) Notice: Subject to any disclaimer, the term of this patent is extended or adjusted under 35 U.S.C. 154(b) by 163 days.

(21) Appl. No.: 12/632,395

(22) Filed: Dec. 7, 2009

(65) Prior Publication Data

US 2010/0151162 A1    Jun. 17, 2010

Related U.S. Application Data

(60) Provisional application No. 61/121,761, filed on Dec. 11, 2008.

(51) Int. Cl.
*B28B 7/32* (2006.01)

(52) U.S. Cl.
USPC ............ 156/245; 156/156; 264/314; 425/393

(58) Field of Classification Search
USPC .......... 249/178, 179, 180; 425/573, 389, 393; 264/314, 564, 565, 566, 567, 313, 316; 156/156, 245, 500
See application file for complete search history.

(56) References Cited

U.S. PATENT DOCUMENTS

| | | | | |
|---|---|---|---|---|
| 3,061,875 A | * | 11/1962 | Gerow | 264/563 |
| 3,671,617 A | * | 6/1972 | Nagase | 264/565 |
| 4,483,731 A | | 11/1984 | Döhle et al. | |
| 4,808,362 A | * | 2/1989 | Freeman | 264/257 |
| 5,762,352 A | * | 6/1998 | Lee | 280/280 |
| 7,662,334 B2 | * | 2/2010 | Miller et al. | 264/552 |
| 2006/0208135 A1 | * | 9/2006 | Liguore et al. | 244/117 R |
| 2007/0096368 A1 | * | 5/2007 | Hanson et al. | 264/314 |

FOREIGN PATENT DOCUMENTS

| | | |
|---|---|---|
| DE | 31 13 791 A1 | 12/1982 |
| DE | 40 39 231 | 6/1992 |
| DE | 195 10 958 A1 | 9/1996 |
| ES | EP 1 707 344 A1 | 10/2006 |
| SE | EP 1 800 842 A1 | 6/2007 |

OTHER PUBLICATIONS

German Office Action from DE 10 2008 054 540.6-16 dated Jul. 23, 2009.
German Office Action from DE 10 2008 054 540.6-16 dated Dec. 18, 2012.

* cited by examiner

*Primary Examiner* — William Bell
(74) *Attorney, Agent, or Firm* — Jenkins, Wilson, Taylor & Hunt, P.A.

(57) ABSTRACT

A method for producing an integral reinforced fiber composite component comprising at least one hollow fiber reinforcing component and a shell component is disclosed and can include first providing a mold core having a target cross-section deviating from a round cross-section adaptable to an inner cross-section of the hollow reinforcing component, introducing the mold core into a cavity of the hollow reinforcing component and fixing it thereafter in the cavity with a fixing agent applying the hollow reinforcing component with the mold core fixed therein to the shell component, and subjecting the mold core to a pressurized medium while applying heat and/or pressure to this arrangement to produce the integral reinforced fiber composite component.

6 Claims, 6 Drawing Sheets

METHOD FOR PRODUCING AN INTEGRAL, REINFORCED FIBRE COMPOSITE COMPONENT AS WELL AS A HOLLOW FIBRE COMPOSITE COMPONENT

CROSS-REFERENCE TO RELATED APPLICATIONS

This application claims the benefit of U.S. provisional application Ser. No. 61/121,761 filed Dec. 11, 2008, the entire disclosure of which is herein incorporated by reference.

FIELD OF THE INVENTION

The present invention relates to a method for producing an integral, reinforced fibre composite component comprising at least one hollow reinforcing component made of fibre composite material and a shell component. The invention also relates to a hollow fibre composite component.

BACKGROUND OF THE INVENTION

Although applicable to any fibre composite components, the present invention and the problem on which it is based will be explained in greater detail hereinafter with reference to planar, carbon fibre reinforced plastic (CFRP) components reinforced with stringers, for example skin shells and shell components for an aircraft.

It is generally known that CFRP skin shells can be reinforced with CFRP stringers in order to withstand the loads which occur in aircraft, with as little additional weight as possible. In this case, a distinction is basically made between two types of stringers: T-stringers and omega-stringers.

The cross-section of T-stringers is composed of the base and the web. The base forms the connecting surface to the skin shell. The use of skin shells reinforced with T-stringers is widespread within the aircraft industry.

Omega-stringers have an approximately hat-shaped profile, of which the lower ends are connected to the skin shell. Omega stringers may be either adhesively bonded, once cured, to the skin shell which is also cured, cured wet-on-wet at the same time as the shell, or adhesively bonded to the cured shell when wet. The first case is most desirable since it is more favourable with regard to the technical processes involved. However, in order to produce skin shells reinforced with omega-stringers, it is necessary to use support or mould cores in all of the various processes described in order to support the hollow profile during the production process. Skin shells with omega-stringers provide the advantage over T-stringers of having better infiltration properties during an infusion process carried out in order to introduce a matrix, for example an epoxy resin, into the fibre semi-finished products. Furthermore, compared with other cross-sectional shapes, this cross-sectional shape offers a good ratio between weight and moment of inertia.

However, when producing fibre composite shells reinforced with omega-stringers, there is the drawback that the material currently used for the support or mould core is expensive and is difficult to remove once the omega-stringers have been formed, such that any material remaining in the stringers contributes to the weight of the fibre composite component and thus to the weight of the aircraft in a disadvantageous manner.

Different production methods may be used to produce hollow components using fibre composite construction methods, the use of which production methods is dependent, inter alia, on the general product-specific requirements, such as production rate, shape or cross-section, requirements regarding surface configuration or strength. Examples of the main production methods are as follows:

Blow hose method

Non-permanent moulding (chemical, mechanical or thermal removal methods)

Cores remaining in the component (for example foam made of synthetic resins)

rotational moulding method filament winding method

However, owing to specific features, the majority of these methods are, during the progression thereof, only suitable for the production of compact components having similar measurements in all dimensions and a relatively small linear extent. In order to produce components, the measurement of which in one axis is considerably greater than that in the other axes, a blow hose method has primarily been used previously on an industrial scale.

In order to produce fibre composite components which must satisfy strict requirements with regard to component weight and mechanical load, it is necessary to shape and compact the laminate by applying a planar pressure to the laminate during the curing process. With conventional production methods, a component is thus shaped by inserting the different woven fabric layers into a female mould. Once all the reinforcing layers of the laminate have been inserted into the mould, these components are saturated with resin, depending on the selected shape of the semi-finished product and the production method, or in the case of production with prepreg fibres, these are placed in the mould. Next, once auxiliary materials such as ventilation fabrics and separating films have been applied, an airtight film is placed on the mould and hermetically sealed onto said mould. Once the air inside the vacuum has been vacuumed off, the component can be pressed in a planar manner and the correct fibre to matrix ratio can be achieved and the laminate can also be produced with no fibre ridges during the curing procedure. However, a prerequisite for this production method is that the surface of the entire laminate should be accessible on one side. When producing a hollow component, this process is not possible owing to the restricted access to the inside of the component after production.

The most significant drawbacks of the aforementioned methods are as follows:

Poor surface quality inside the component when producing a component using an excessively long blow hose. In this regard, FIG. 1 shows an example of a conventional method for producing a hollow reinforcing component 2 having a trapezoidal inner cross-section 13. The hollow reinforcing component 2 is attached as a stringer in order to reinforce a shell component 3. An excessively long blow hose 12 having an originally circular cross-section is arranged inside the hollow reinforcing component 2. When the hose is inflated, resin accumulations 15 are created by the formation of folds. Owing to these resin accumulations 15, problems regarding an increased likelihood of cracks as a result of the unreinforced resin result in addition to problems regarding a poor fibre: matrix ratio.

The blow hose 12 is configured as a hose having a round cross-section. When the blow hose 12 is pressurised, said blow hose 12 rests against the inner walls of the component 2 and of the uncured shell laminate 3. The blow hose 12 cannot completely fill the corner regions. The blow hose 12 is thus arched and resin accumulations 15 are formed. The lack of pressure on the laminate may lead to the formation of ridges and localised excesses of resin (undulations) in the laminate.

Owing to the blow hose 12 not sufficiently abutting localised portions, fibre ridges may be produced.

The production method is complicated further by the complex integration of the blow hose 12 into the mould and the component.

The process poses an increased risk when a thin-walled blow hose 12 is used, owing to the hose becoming arched in the corners of the component, thus causing the hose material to expand excessively until it bursts, possibly destroying the entire component.

Labour-intensive removal and production of the core.

Production of components having narrow radii in cross-section or of a specific shape is not possible with the methods described.

If auxiliary production materials remain in the component, the weight of the component increases whilst the mechanical values of the component are not increased at all, or are only increased slightly by the auxiliary material.

Accordingly, one object of the present invention is to provide a method for producing an integral, reinforced fibre composite component comprising at least one hollow reinforcing component made of fibre composite material and a shell component.

SUMMARY OF THE INVENTION

Accordingly, a method for producing an integral, reinforced fibre composite component comprising at least one hollow reinforcing component made of fibre composite material and a shell component is provided and comprises the following method steps: producing a mould core from a hose having a target cross-section deviating from a round cross-section and is adapted to an inner cross-section of the hollow reinforcing component to be produced, at least in portions, or substantially corresponds with said inner cross-section, at least in portions; introducing the mould core into a cavity in the at least one hollow reinforcing component; fixing the mould core in the at least one hollow reinforcing component using a fixing agent; applying the at least one hollow reinforcing component with the mould core fixed therein to the shell component; and subjecting the mould core to a pressurised medium and applying heat and/or pressure to this arrangement in order to produce the integral, reinforced fibre composite component comprising the at least one hollow reinforcing component and the shell component.

The method according to the invention makes it possible to produce hollow components having at least a unidimensionally long extent and having sharp edges, strict requirements regarding mechanical characteristic values of the surface formation inside the component and the removal of the mould material from inside the component being satisfied at the same time.

The present invention thus provides the advantage over the aforementioned known solutions that, owing to the use of specially shaped plastics material film hoses having a cross-section deviating from a round cross-section, the method according to the invention enables the production of, for example, fibre composite components which are very accurate in shape, have sharp edges with corners having defined radii, defined wall thicknesses, dimensional accuracy with low production costs and at least unidimensionally long lengths. It is possible to produce hoses having a cross-section which is optimally shaped for the respective intended application.

In order to press the laminate, which is necessary for curing, a method is thus provided, in which the hollow interior of the component is filled and the pressure on the uncured laminate is also transferred to the corner regions having small radii.

In the present description, a "hose" is to be understood as a hose produced by a conventional extrusion or blow moulding extrusion method, having a round or circular cross-section and which is provided in a wound state for example.

The term "target cross-section" is to be understood as a hose cross-section presented by the hose shaped to form the mould core. A first target cross-section is shaped by means of the core tool. A second target cross-section may optionally be obtained by a further method step.

A "reinforcing component" is what is known as a stringer.

Advantageous embodiments and improvements of the present invention can be found in the dependent claims.

Production by means of this method serves to produce an integral, reinforced fibre composite component, for example an integral skin-stringer composite wherein a cured stringer is adhesively bonded to an uncured skin. Prepreg fibres are used as a semi-finished product for this component. In principle however, this method may also be used with small modifications during its progress (for example positive-laying method) for other components, other shapes of the semi-finished product, other fibre composites, materials and other processes, such as resin infusion methods or hand laminating methods.

Combinations of uncured stringers on uncured skin and uncured stringers on cured skin are also possible.

In particular but not exclusively, the method according to the invention may be used to produce hollow elongate components made of fibre composite materials, for which components there are strict requirements regarding inner shape and said components should not contain any residual auxiliary production materials so as to be light in weight.

Production may take place by means of what is known as a co-bonding method, in which a component which has already been cured is adhesively bonded with another, uncured component via the matrix of the uncured component or using an additional resin film. In order to obtain a reliable adhesive bond and sufficient pressing of the skin in the hollow region of the cross-section of the stringer, a hose is used which presses together the individual layers of the laminate of the skin by applying excess pressure. In contrast with the conventional blow hose method, in which hoses made of a resilient material or those which are significantly excessively long and have a round or circular cross-section are used, a hose is used in the method according to the invention as a mould core, which hose has a cross-section which corresponds with the inner cross-section of the component to be produced and/or is adapted to said inner cross-section. This hose has such a cross-section that small tolerances during production of the stringer can be compensated by defined excess folds in the cross-section of the hose profile, or by the resilience of the hose material. By shaping the hose so as to have a profile adapted to the subsequent inner cross-section of the component to be produced, in such a way that the hose is pre-shaped, at least in the corner regions of the component to be produced, by being creased and/or hot formed and/or extruded (this therefore being in contrast with the use of hoses which are considerably excessively long and/or highly resilient), it is also possible to produce components having sharp corners in cross-section which cannot be produced using a conventional hose of excessive length owing to the hose becoming arched in the corners (see FIG. 1).

The hose is first applied over a core tool having cutouts. The cutouts are necessary in order to tighten the hose on the periphery of the core or to adapt it to the cross-section of the core tool, i.e. to the cross-section of the core, using a force which, for example, is produced by a vacuum or a forming tool, for example special slide rails.

When the applied hose is loaded with the force, folds or what are known as excess folds are produced in the longitudinal direction of the hose. These are necessary in order to compensate for any possible variations in the cross-section caused by manufacturing tolerances or local reinforcements during production of fibre composite components (for example in the case of the blow hose method).

The hose pressed in this manner onto the core cross-section of the core tool is then heated to a predetermined forming temperature in accordance with the hose material and is kept at this temperature for a predetermined length of time, for example for a short while, in order to reduce the tensions which have been produced in the material of the semi-finished hose product by the shaping and pressing-on processes. A first target cross-section is thus obtained.

The term "mould core" is to be understood as a hose shaped in this manner and made of at least one plastics material and/or rubber, and which is shaped in this way to the target cross-section before being inserted into the fibre composite semi-finished product, in such a way that it is configured with a sharp edge, at least in one of the corners of the subsequent fibre composite component. The production of a hose of this type is possible, for example by extrusion and/or creasing and/or rolling and/or folding and/or hot forming and/or pressing.

In order to strip the mould core thus formed from the core tool after cooling, the plastics material film hose may be subjected to pressurised air. Removal and application are further facilitated by the material of the core tool exhibiting low frictional resistance. At the same time, the core tool has a material which is thermally stable at the predetermined forming temperature of the hose, such as a plastics material, for example PTFE, a metal or a combination of these materials.

The hose formed as a mould core may then be cut to a required length.

The mould core produced in this way with a cross-section deviating from a round cross-section is also distinguished, in particular, in that it is thin-walled and has a cross-sectional shape having sharp-edged corners. The wall thicknesses range from approx. 30 µm . . . 4 mm, in particular from 0.2 . . . 0.3 mm. The radius of the hose at the corners facing the fibre composite component may be between 0.01 . . . 12 mm, in particular between 0.1 . . . 3 mm. For example, it is also possible for this sharp-edged corner to be configured as a small radius, as a fillet having a plurality of radii, for example an ellipsoid, as an arrangement having many corners or the like.

In a preferred embodiment, it is provided for the periphery of the core cross-section of the core tool to be greater than the periphery of the cross-section of the hose. The periphery of the hose is thus determined as a function of the coefficients of friction of the core and hose materials (polymers, polyamides).

"Fibre semi-finished products" are to be understood as woven fabrics, non-woven fabrics, fibre mats, rovings and semi-finished products produced therefrom. These are provided with a matrix, for example an epoxy resin, and are then cured to form a fibre composite component, for example using an autoclave.

A separating layer may preferably also be attached to the plastics material film hose, which layer reduces adhesion of the cured fibre composite component. The plastics material film hose is thus easily removed once the fibre composite component has, at least, been cured.

The mould core thus produced in the form of the shaped hose is integrated into and fixed in the stringer. For this purpose, the fixing agent may be configured as an adhesive strip, for example an epoxy adhesive strip. This may take place manually or by a (partly) automated method. The stringer is then attached to the uncured skin together with the integrated mould core, this arrangement being provided with an auxiliary assembly, for example a vacuum assembly, and the ends of the hose being guided out of said assembly.

The arrangement may then be cured in an autoclave. Owing to the pressure in the autoclave, which acts on the inside of the hose, the laminate of the skin is sufficiently compacted inside the stringer. The hose may also be subjected to a pressurised medium, for example a fluid.

"Pressurised" may also be understood as a pressure differential.

In contrast with the conventional blow hose methods, undefined radii are not formed by stamping the plastics material film hose comprising the target cross-section into the corners of the stringer. Deviations in size in the corner regions which are caused by tolerances during stringer production or by local thickenings in the laminate of the skin may be compensated by the defined (resilient) folds inside the shaped plastics material film hose.

Once the component has been cured, the hose may be removed again from the component, for example by applying a tensile force to the ends of the hose or by drilling. The hose, which may be adhesively bonded to the inner walls of the hollow component, is first removed, for example by being subjected to a vacuum. Drilling may also release the hose. Pressurised air may also be used to blow out the hose.

Applications of the method according to the invention may include the production of components using conventional hand laminating methods or the production of components from prepreg fibres (prepregs) and subsequent curing by the autoclave method. Applications to produce components by other methods and consisting of other materials, for example ceramic components, are also conceivable.

For example, the stringer may be supplied together with the mould core-hose as an assembly which is ready for installation.

An integral, reinforced fibre composite component comprising at least one hollow reinforcing component made of fibre composite material and a shell component is produced by the aforementioned method according to the invention.

A method for producing a hollow reinforcing component made of fibre composite material comprises the following method steps:
providing a mould core formed of a hose having a target cross-section deviating from a round cross-section and is adapted to an inner cross-section of the hollow reinforcing component to be produced, at least in portions, or substantially corresponds with said inner cross-section, at least in portions; arranging, at least in portions, at least one fibre semi-finished product on the mould core and/or a die in order to produce at least one moulded portion of the hollow fibre composite component to be produced; and subjecting the mould core to a pressurised medium in such a way that the pressure inside the mould core is greater than that outside the mould core, and applying heat and/or pressure to this arrangement in order to produce the hollow fibre composite component.

In this method, the fibre semi-finished product may be arranged in part or completely on the mould core. If the fibre semi-finished product is arranged completely on the mould core, this means that the mould core is covered by the fibre semi-finished product. If the fibre semi-finished product is arranged in part on the mould core, the mould core may be arranged on a base or a die. It is also possible for the fibre semi-finished product to be first arranged in a die and then for the mould core to be introduced into the die on the fibre semi-finished product.

The pressure may be produced by a pressure source and/or by a pressure differential.

A hollow fibre composite component is produced by this method. The component may be used within many different fields of application, for example where lightweight construction is required, such as within the fields of vehicle manufacture, aerospace, sports equipment (for example bicycle frames) and many more.

BRIEF DESCRIPTION OF THE DRAWINGS

The invention will be described hereinafter in greater detail and with reference to the embodiment illustrated in the schematic figures of the drawings, in which.

In all figures of the drawings, like and functionally-similar elements are each provided with like reference numerals, unless otherwise stated.

DETAILED DESCRIPTION OF THE DRAWINGS

Figure 1:
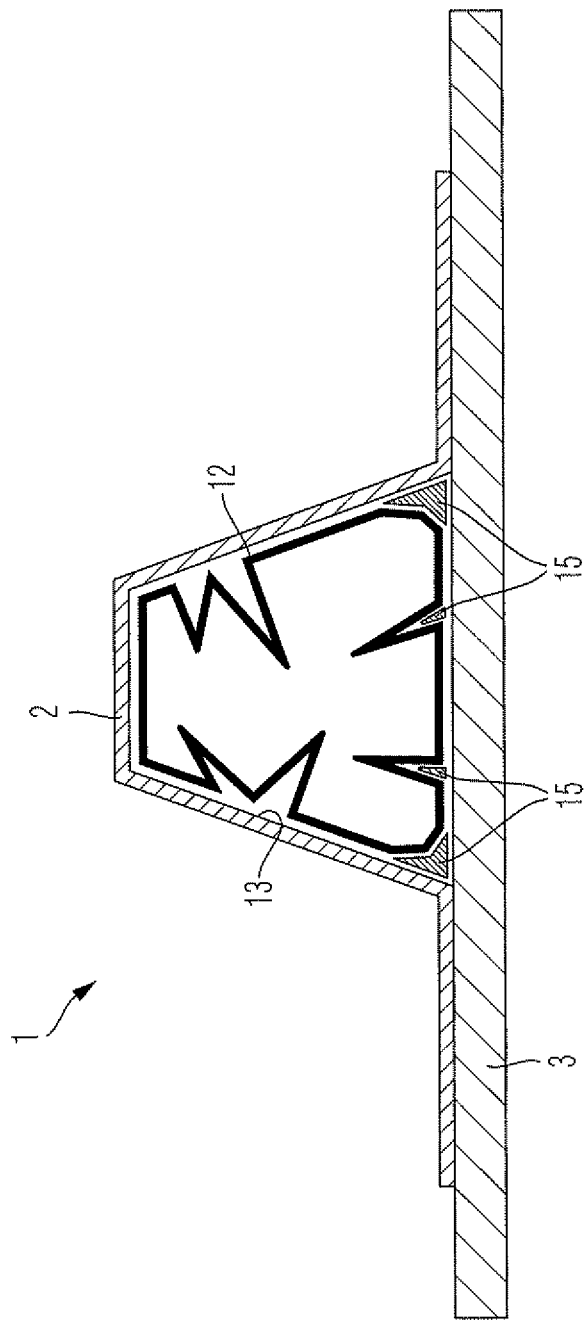
FIG. 1 is a schematic cross-section of a conventional production method for producing an integral, reinforced fibre composite component using an excessively long pressure hose.

FIG. 1 is described above and will not be described here in greater detail.

Figure 2:
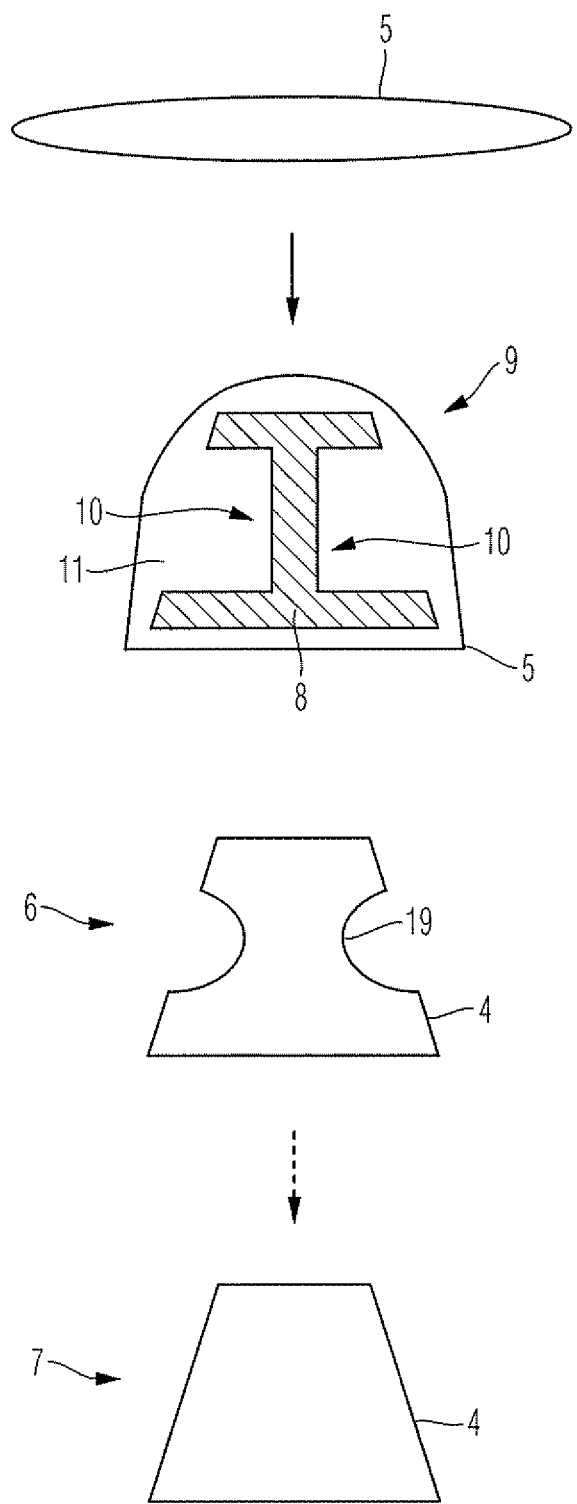
FIG. 2 shows steps for shaping a semi-finished hose into target cross-sections in accordance with a first step of the method according to the invention.

FIG. 2 schematically shows steps for shaping a hose 5 into target cross-sections 6 and 7 of a mould core 4.

The hose 5 is produced with a round cross-section following production by an extrusion or extrusion blow moulding method and is wound in a planar manner into the shape shown. This hose 5 acts as a semi-finished product for the production of a plastics material film hose as a mould core 4 having a first target cross-section 6 and a second target cross-section 7 which is trapezoidal in the example shown in FIG. 2. The second target cross-section 7 corresponds to an inner cross-section 13 of a reinforcing component 2 (see FIG. 6) which will be described in greater detail below. The mould core 4 comprises a core interior 11.

The method for producing the mould core 4 will be described hereinafter in an exemplary manner. It is also possible to produce mould cores 4 having other target cross-sections similarly to this example and with any desired modifications.

The aim is to produce a thin-walled plastics material film hose as a mould core 4 having the second target cross-section 6. The use of a plastics material film hose of this type as an auxiliary or mould core 4 in order to produce components made of fibre composite materials may require a hose of this type, which has additional excess folds in order to compensate for any possible deviations in the cross-section of a fibre composite component owing to manufacturing tolerances or local reinforcements.

The hose 5 is first provided, for example in a wound state, and is then applied over a core die 8 having a core cross-section 9.

The core cross-section 9 is similar to the second target cross-section 7, which is trapezoidal, but has lateral cutouts 10 which are symmetrical in this instance. It is easily conceivable that the core die 8 is arranged perpendicular to the drawing plane and extends in this direction over a specific length. The cutouts 10 also extend longitudinally in this direction. The periphery of the core cross-section 9 is enlarged by the cutouts 10. It is preferable for this periphery to be greater than the periphery of the cross-section of the hose. The ratio of the core cross-section 9 to the periphery of the cross-section of the semi-finished hose is to be determined as a function of the coefficients of friction of the core and hose materials. The core die may consist of plastics material, for example PTFE, or metal or of a combination of these or other materials. The hose may be produced from a polymer or polyamide.

In a second production step, the air is vacuumed off from the interior 11 of the hose 5 and the hose 5 is pressed onto the cross-section 9 of the core. This is possible owing to the corresponding configuration of the cutouts 10 in size, position, number and shape as well as a corresponding configuration of the surface of the core and the selection of the excess of the periphery of the hose. Once the hose 5 has been pressed onto the cross-section 9 of the core, the hose 5 is heated to a predetermined forming temperature and is kept for a short while at this temperature for a predetermined length of time, in order to reduce the tensions which have been produced in the material of the hose 5 by shaping and stretching processes.

Alternatively, the force may be applied using a forming tool (not shown).

Once the hose 5 thus shaped has cooled, it is stripped from the core die 8 in a further step. As a supportive measure, pressurised air can be fed into the interior 11. The hose 5 thus shaped is now the mould core 4 having the first target cross-section 6. In the region of the sides of the mould core 4, projecting fold regions 19 can be seen in the interior 11 which were produced by being pressed into the cutouts 10 of the core die 8.

This mould core 4 may, for example in a female mould of a die, be shaped so as to have another, more specifically the second, target cross-section 7.

Figure 3:
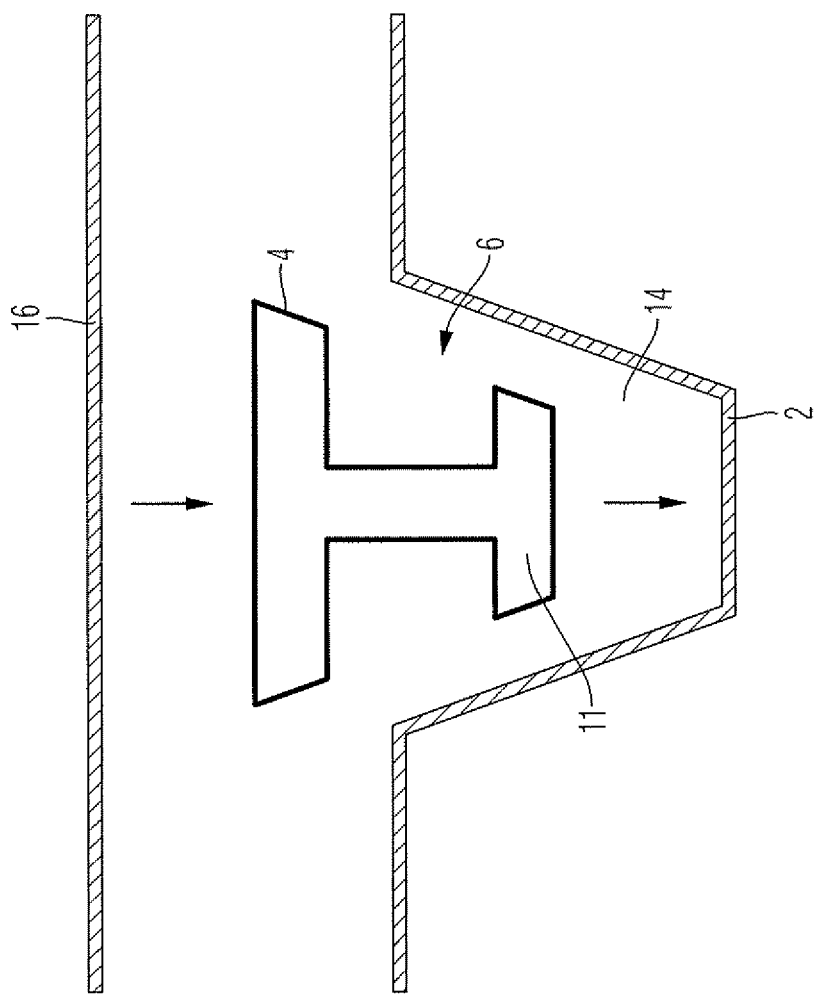
FIG. 3 is a schematic view of a second step of the method according to the invention.
Figure 6:
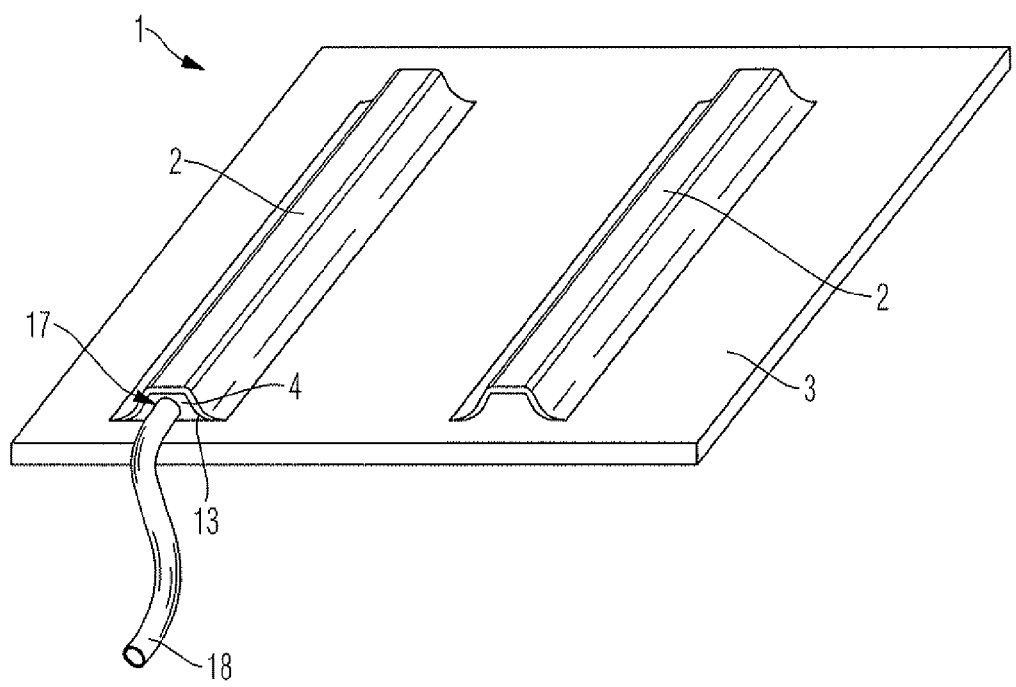
FIG. 6 is a perspective view of an integral, reinforced fibre composite component according to the invention.

The mould core 4 thus formed (in this example having the first target cross-section 6) is first inserted into a cavity 14 in the reinforcing component 2 in order to connect the reinforcing component 2 (see FIG. 6) to a shell component (see FIG. 6 also). FIG. 3 shows this in a schematic representation of a second step of the method according to the invention. The reinforcing component 2 is configured as a stringer having the subsequent cavity 14.

The mould core 4 is fixed in the reinforcing component 2 by means of a fixing agent 16, for example an epoxy adhesive strip. The fixing agent 16 may also comprise magnetic holders, for example.

Figure 4:
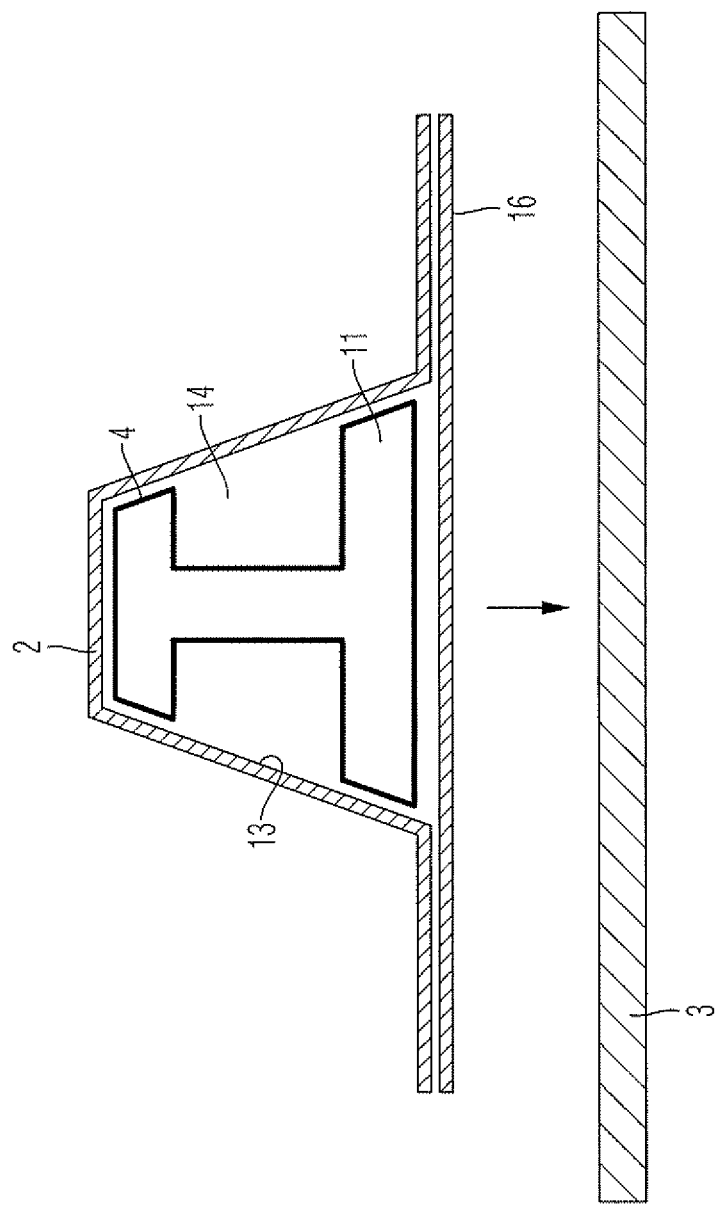
FIG. 4 is a schematic view of a third step of the method according to the invention.

The arrangement thus obtained is shown in a next step, illustrated in FIG. 4, with the fixing agent 16 attached first to a laminate of the shell component 3, the mould core 4 remaining fixed in the cavity 14 having the inner cross-section 13 by means of the fixing agent 16.

Following this application, there is an auxiliary assembly, for example for an autoclave method, and the ends of the mould core 4 are guided out of the vacuum assembly.

Figure 5:
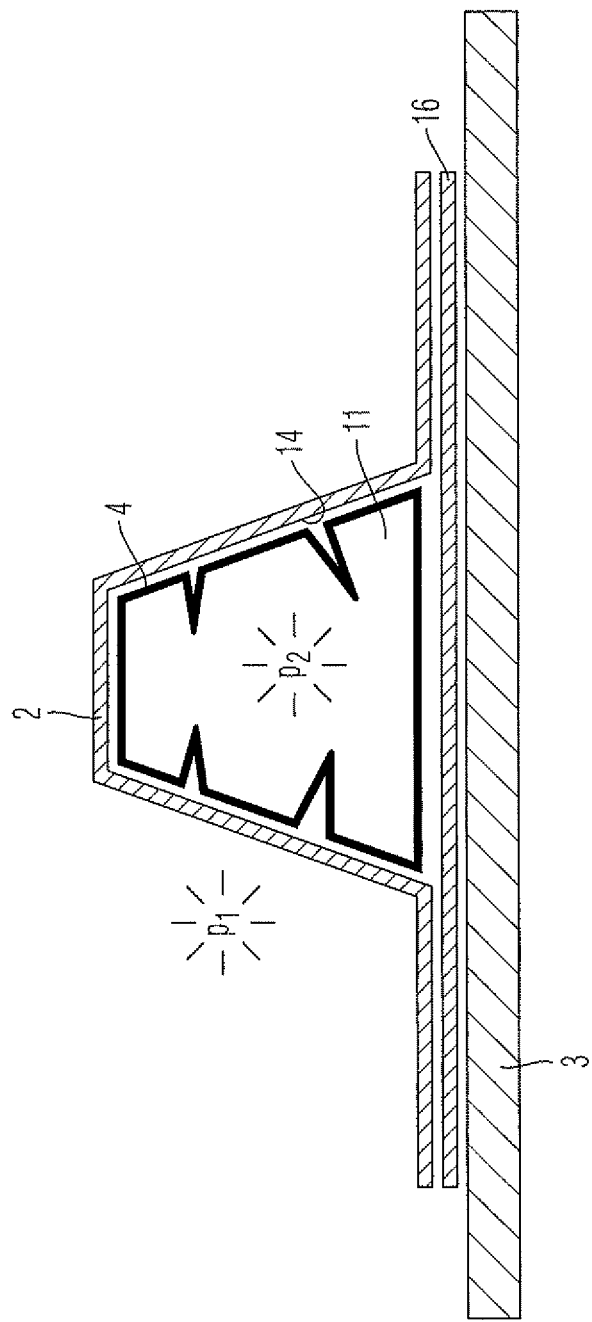
FIG. 5 is a schematic view of a third step of the method according to the invention.

FIG. 5 shows a schematic view of a third step of the method according to the invention, in which the arrangement is cured in an autoclave (not shown) in this example. For this purpose, the arrangement is covered by a vacuum film (not shown) for example, in which an external pressure P1 is produced using a vacuum source. An autoclave of, for example, approximately 7 . . . 10 bar acts externally on the vacuum film and thus on the arrangement. The interior 11 of the core is connected to the autoclave pressure surrounding the vacuum film via its hose ends which are guided out of the vacuum film. However, the interior 11 of the core may also be subjected to another pressurised medium from another source. A pressure differential between the pressure in the autoclave and the external pressure P1 is thus produced, an internal pressure P2 (for example approx. 3 . . . 12 bar) being produced in the interior 11 of the core which pushes the mould core 4 apart. The pressure P2 is significantly greater than P1. The mould core 4 may also be subjected to a pressurised medium, for example pressurised air. The laminate of the shell component 3 is sufficiently compacted beneath the cavity 14 in the reinforcing component 2 by the mould core 4. In contrast with conventional blow hose methods (see FIG. 1), defined, and in this example small radii are formed by stamping the semi-finished hose 5 into the corners of the reinforcing component 2 to form a mould core 4. The regions with folds are resiliently changed owing to the effect of the pressure P2, in such a way that they are pressed outwardly against the wall of the cavity 14 with the formation of inner folds.

FIG. 6 is a perspective view of an integral, reinforced fibre composite component 1 according to the invention (in this example it may be a skin-stringer composite for the aviation or aerospace industry) comprising two hollow reinforcing components 2 made of a fibre composite material and attached to a shell component 3 for reinforcement thereof and connected to the shell component 3 via its matrix. The left-hand reinforcing component 2 is shown with a connection line 18, which forms an outwards extension of the interior 11 of the core (autoclave assembly has already been removed). The connection line 18 is, in this example, connected via a connection 17 to the mould core 4 arranged in the inner cross-section 13 of the reinforcing component 2. The mould core 4 may also be provided with a connection line 18 at the other end of the left-hand reinforcing component 2, which is not shown but is easily conceivable.

The mould core 4 is guided out of the right-hand reinforcing component 2. This may be achieved, for example, in that a tensile force is exerted at the ends of the mould core 4 via the connection line 18, as a result of which the mould core 4 may first be released from the inner wall of the reinforcing component 2 and then may be pulled out. It is also possible for the mould core 4 to be subjected to a vacuum via the connection line 18, as a result of which its release and removal is facilitated.

The method according to the invention thus makes it possible to produce the integral skin-stringer composite 1 comprising hollow reinforcing components 2. A structural design of optimum weight is possible owing to the improved structural configuration which is thus possible.

The following advantages are thus obtained with this example and others (it is easily conceivable that these advantages can be transferred to other applications):

easy integration of the mould core 4 into the reinforcing elements 2 is possible owing to the relatively high level of rigidity, produced by the shape of the shaped semi-finished hose 5 forming the mould core 4.

Integration of the mould core 4 into the component 2 is greatly facilitated by the shaping process, since the mould core can be integrated with an accurate fit owing to its shape.

Good reproduction of edges and corners with defined radii. A plurality of small radii can produce a common radius. Polygons can thus be produced together as a common radius or as a fillet or the like.

Pressing of the laminate of the shell component 3 into the corner regions which cannot normally be achieved in conventional methods using unshaped hoses owing to the formation of arches.

Cured components and the mould core 4 can be provided as a single unit.

Production costs are only slightly higher than those for conventional hose core methods.

Potential for use to produce components, in which a core remaining in the component was previously necessary for manufacturing reasons (for example struts in pressure caps).

Increase in process safety compared with conventional hose core methods, since in this method thick-walled hoses can be used which could not be used previously owing to the necessary excess folds and the danger associated therewith of damage in the case of creasing.

The invention is not limited to the specific method shown in the Figures for producing a fibre composite component, for example in the aviation and aerospace industry.

The shape of the target cross-sections may be modified in many different ways. More than two target cross-sections, for example in a plurality of shaping steps, may be obtained, for example in order to produce more complex cross-sections.

For example, it is possible to produce a hollow reinforcing component 2 made of fibre composite material, using the following method steps:

providing a mould core 4 formed of a hose 5 having a target cross-section 6, 7 deviating from a round cross-section and is adapted to an inner cross-section 13 of the hollow reinforcing component 2 to be produced, at least in portions, or substantially corresponds with said inner cross-section, at least in portions; arranging, at least in portions, at least one fibre semi-finished product on the mould core 4 and/or a die in order to produce at least one moulded portion of the hollow fibre composite component to be produced; and subjecting the mould core 4 to a pressurised medium in such a way that the pressure inside the mould core 4 is greater than that outside the mould core, and applying heat and/or pressure to this arrangement on order to produce the hollow fibre composite component 2. The hollow fibre composite component may, for example, be a reinforcing component in the form of a stringer.

Of course, other hollow fibre composite components may thus also be produced, for example bicycle frames and lightweight components in different fields of application.

What is claimed is:

1. A method for producing an integral, reinforced fibre composite component comprising at least one hollow reinforcing component made of fibre composite material and a shell component, comprising:

applying a semi-finished hose product over a core die;

subjecting the applied semi-finished hose product to a predetermined force in order to press the semi-finished hose product onto a core cross-section of the core die, wherein the core die comprises at least one surface with cutouts, adapted for forming folds in the semi-finished hose product while on the core die in the longitudinal direction of the semi-finished hose product;

heating the semi-finished hose product to a predetermined forming temperature for a predetermined length of time such that the semi-finished hose product assumes a shape of the core die, forming a mould core having a cross-section deviating from a flat and a round cross-section, before being inserted into the cavity of the hollow reinforcing component, and wherein the mould core at least in portions is pre-shaped to inner cross-section of said cavity of the hollow reinforcing component;

stripping the shaped and cooled mould core from the core die;

introducing the mould core into the cavity of the at least one hollow reinforcing component;

fixing the mould core in the at least one hollow reinforcing component using a fixing agent;

applying the at least one hollow reinforcing component with the mould core fixed therein to the shell component; and subjecting the mould core to a pressurized medium and applying heat and/or pressure to this arrangement in order to produce the integral, reinforced fibre composite component comprising the at least one hollow reinforcing component and the shell component.

2. The method according to claim 1, wherein the at least one hollow reinforcing component made of fibre composite material is cured or is not cured before the mould core is introduced.

3. The method according to claim 1, wherein the fixing agent is configured as an adhesive strip.

4. The method according to claim 1, wherein once the integral, reinforced fibre composite component has been cured, the mould core is no longer subjected to the pressurized medium and the mould core is pulled out of the at least one hollow reinforcing component.

5. The method according to claim 4, wherein the mould core is released and pulled out of the at least one hollow reinforcing component by applying a tensile force to the ends of the mould core, by drilling and/or by additional pressurized air and/or a vacuum.

6. The method according to claim 1, wherein the method substantially comprises a hand laminating, prepreg, transfer moulding and/or vacuum infusion process.

* * * * *